(12) United States Patent
Hosseini et al.

(10) Patent No.: US 9,865,145 B2
(45) Date of Patent: *Jan. 9, 2018

(54) CONTROL TAG WITH ENVIRONMENTALLY SELECTED CONDITIONAL RESPONSE

(71) Applicants: Seyed A. Hosseini, Long Beach, CA (US); Steve E. Trivelpiece, Rancho Santa Margarita, CA (US); Craig E. Trivelpiece, Mission Viejo, CA (US)

(72) Inventors: Seyed A. Hosseini, Long Beach, CA (US); Steve E. Trivelpiece, Rancho Santa Margarita, CA (US); Craig E. Trivelpiece, Mission Viejo, CA (US)

(73) Assignee: Tyco Fire & Security GmbH, Neuhausen Rheinfall (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/438,027

(22) Filed: Feb. 21, 2017

(65) Prior Publication Data

US 2017/0162017 A1 Jun. 8, 2017

Related U.S. Application Data

(62) Division of application No. 14/164,536, filed on Jan. 27, 2014, now Pat. No. 9,576,454.

(51) Int. Cl.
*G08B 13/14* (2006.01)
*G08B 13/24* (2006.01)

(52) U.S. Cl.
CPC ................ *G08B 13/2485* (2013.01)

(58) Field of Classification Search
CPC ................ G06Q 10/00; G06K 1/00
See application file for complete search history.

(56) References Cited

U.S. PATENT DOCUMENTS

| 2005/0099298 A1* | 5/2005 | Mercer | G06K 7/0008 340/572.1 |
|---|---|---|---|
| 2009/0045916 A1* | 2/2009 | Nitzan | G06K 19/0723 340/10.1 |
| 2009/0237223 A1* | 9/2009 | Zimmerman | G06K 19/0707 340/10.51 |

FOREIGN PATENT DOCUMENTS

| FR | 2864380 | 6/2005 |
|---|---|---|
| GB | 2333389 | 7/1999 |

* cited by examiner

*Primary Examiner* — Shirley Lu
(74) *Attorney, Agent, or Firm* — Fox Rothschild LLP; Robert J. Sacco; Carol E. Thorstad-Forsyth

(57) ABSTRACT

Systems (100) and methods (300) for selective device responsiveness using a plurality of control tags (132) affixed to a plurality of objects (102). The methods involve: receiving, by a plurality of control tags, a reporting command signal sent from an interrogation device via a communications link; and communicating a response to the reporting command signal from only those of the plurality of control tags which are (1) currently being moved, (2) have been moved within a first specified period of time, and/or (3) have a surrounding environment with at least one characteristic that has recently changed.

5 Claims, 4 Drawing Sheets

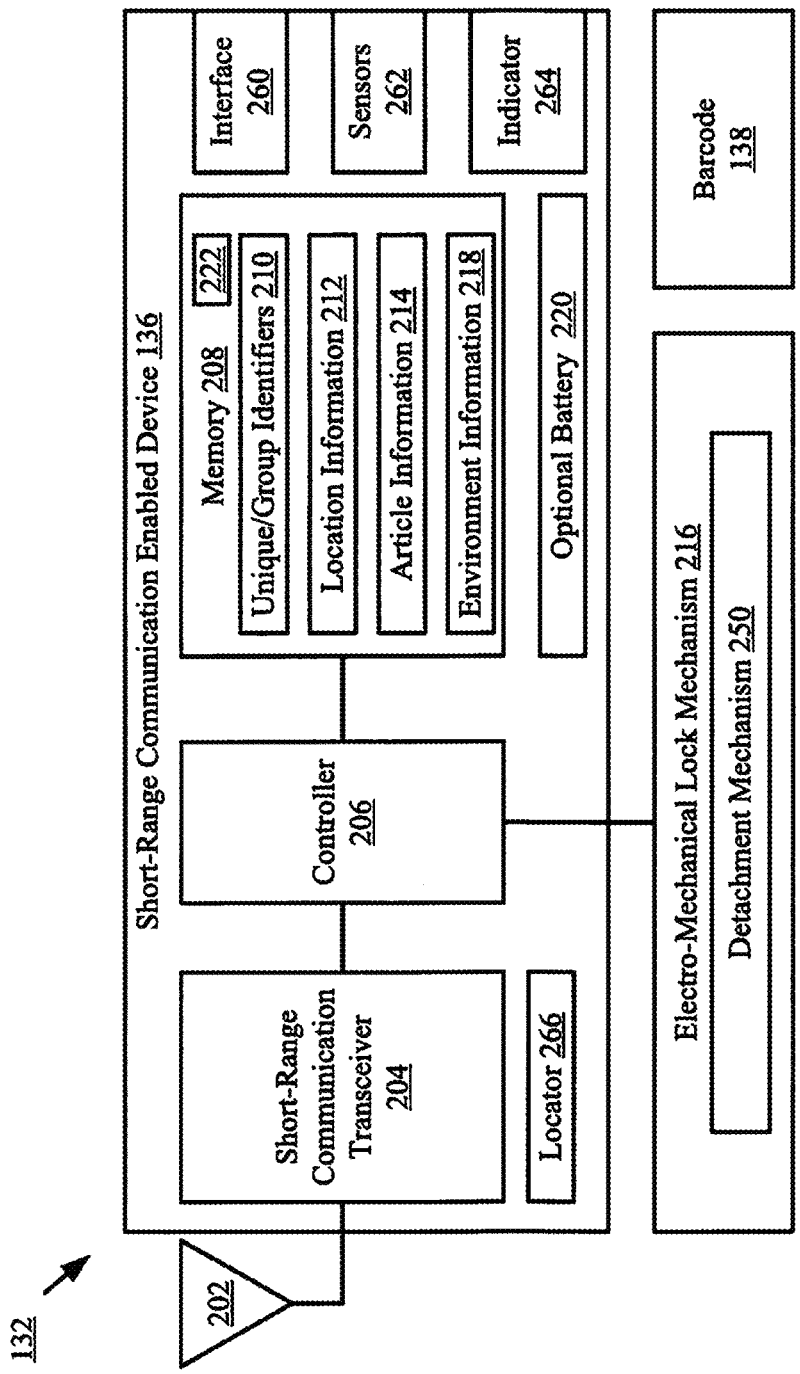

CONTROL TAG WITH ENVIRONMENTALLY SELECTED CONDITIONAL RESPONSE

CROSS REFERENCE TO RELATED APPLICATIONS

This application is a divisional application of U.S. patent application Ser. No. 14/164,536 filed Jan. 27, 2014, now U.S. Pat. No. 9,576,454, and claims the benefit thereof. This application and U.S. patent application Ser. No. 14/164,536 both claim the benefit of U.S. Provisional Patent Application Ser. No. 61/763,008 filed Feb. 11, 2013. The contents of the above listed documents are hereby incorporated herein by reference.

FIELD OF THE INVENTION

This document relates generally to control tags for article surveillance and/or tracking systems. More particularly, this document relates to systems and methods for selective device responsiveness.

BACKGROUND OF THE INVENTION

A typical Electronic Article Surveillance and Inventory Control ("EASIC") system in a retail setting may comprise a monitoring system and at least one control tag or label attached to an article to be protected from unauthorized removal. The monitoring system establishes a surveillance zone in which the presence of control tags and/or labels can be detected. The surveillance zone is usually established at an access point for the controlled area (e.g., adjacent to a retail store entrance and/or exit). If an article enters the surveillance zone with an active control tag and/or label, then an alarm may be triggered to indicate possible unauthorized removal thereof from the controlled area. In contrast, if an article is authorized for removal from the controlled area, then the control tag and/or label thereof can be deactivated and/or detached therefrom. Consequently, the article can be carried through the surveillance zone without being detected by the monitoring system and/or without triggering the alarm.

In some scenarios, it is desirable to track control tags present within the controlled area. As such, various solutions have been derived for this purpose. One such solution involves discovering Radio Frequency Identification ("RFID") enabled control tags using an RFID interrogator. The RFID protocols employed by this solution work well for a small number of control tags in a physically controlled environment. However, in environments with a relatively large number of visible and/or moving control tags, there are severe limitations in tracking items and detecting theft in a crowded retail facility.

Since thousands of tagged products may enter and exit a particular retail facility every day, there are challenges to determine the locations of all the control tags. This is particularly problematic for continuously tracking the control tags. Monitoring at the store exits needs to accurately and quickly track control tags that are exiting the retail store while ignoring hundreds or more stationary control tags. With the current RFID protocols and the exit constraints, the exit monitoring process misses control tags and fails to detect theft of retail items. Also, RF reflections from the surrounding environment often cause false positive detections.

The RFID protocol problem results from the number of control tags detected or "seen" by the RFID interrogator and the ability to track single control tags quickly. Typically, the RFID protocol opens up a variable number of timeslots and all the control tags are randomly assigned to the timeslots for communication. Too many timeslots wastes a lot of valuable time, and too few timeslots cause many collisions (e.g., more than 1 control tag per timeslot) such that there are reduced communications. Store environments with many control tags and reflections of control tags results in a large amount of time in communication with unimportant control tags. This wasted time prevents the accurate tracking of control tags at the retail store exits.

Many techniques that can be used to track control tags (such as phase changes or Doppler effects) don't work well in environments of more than a few visible control tags or when a control tag is only seen for less than a second. Many of these techniques require at least five samples to accurately determine control tag position and motion. In the limited confines of a retail store environment, there is generally not enough time and samples to effectively use these techniques with sufficient accuracy. Another method has attempted to define an exclusion zone which uses a large area of physical isolation to greatly reduce the number of control tags seen and reflections by other control tags. This method works technically, but wastes a great deal of retail store space that is either not available or expensive. Control tag session control which is a method of grouping control tags and isolating groups of control tags from each other such that control tags of each group can only work in particular area or zone of the retail store environment. In this case, the retail stores often require multiple RFID interrogators to cover multiple physical zones of the retail store environment. As such, the effectiveness of session control drops off rapidly in most store environments.

There are collisions with multiple RFID interrogators trying to control various session parameters at the same time causing many control tags to be missed. In addition, control tags can move out of its assigned zone without being detected. There have been RFID devices which combine acceleration shock detection devices and RFID devices. In this case, the RFID device of the control tag is read to determine if a product attached thereto has experienced a shock of at least 50 g. Despite the advantages of this solution, it doesn't solve the problem of quickly communicating ("talking") to the correct control tags in a retail store environment.

SUMMARY OF THE INVENTION

The present invention concerns implementing systems and methods for selective device responsiveness using a control tag (e.g., a security tag/label or an inventory control tag/label) affixed to an object. The methods involve receiving, by the control tag, a reporting command signal sent from an interrogation device via a communication (e.g., <50 feet). The reporting command signal comprises information indicating that it is a special reporting command signal to which only certain ones of a plurality of receiving control tags should respond. In response to the reception of the reporting command signal, the control tag obtains information indicating whether it should respond to the reporting command signal. The information indicates that at least one of the following condition exists: (1) the control tag is or is not currently being moved; (2) the control tag has or has not been moved within a first specified period of time; and (3) a characteristic of a surrounding environment has or has not changed with a second specified period of time. If the information indicates that the control tag should respond to the reporting command signal, then the control tag communicates a response signal to the interrogation device. In contrast, if the information indicates that the control tag should not respond to the reporting command signal, then the control tag ignores the reporting command signal such that the response signal is not sent therefrom to the interrogation device.

In some scenarios, the response signal is sent from the control tag when the information indicates at least one of the following: the control tag is currently being moved; the control tag has been moved within the first specified period of time; and the characteristic of the surrounding environment has changed within the second specified period of time. Accordingly, the reporting command signal is ignored when the information indicates at least one of the following: the control tag is not currently being moved; the control tag has not been moved within the first specified period of time; and the characteristic of the surrounding environment has not changed within the second specified period of time.

Also, the control tag may comprise at least one sensor. The sensor is provided for performing sensing operations to detect motion of the control tag or a change in the characteristic of the surrounding environment. The sensing operations can be performed by the sensor prior to or subsequent to the reception of the reporting command signal at the control tag. For example, if the control tag is an active device, then the sensing operations are performed prior to the reception of the reporting command signal. In contrast, if the control tag is a passive device, then the sensing operations are performed subsequent to the reception of the reporting command signal.

In those or other scenarios, the information obtained by the control tag comprises a value of at least one protocol session parameter (e.g., an RFID protocol session parameter). The protocol session parameter is set to a first value when at least one sensor of the control tag detects movement of the control tag and/or a change in the characteristic of the surrounding environment. The protocol session parameter is re-set to a second value in response to the communication of the response signal from the control tag to the external device.

DESCRIPTION OF THE DRAWINGS

Embodiments will be described with reference to the following drawing figures, in which like numerals represent like items throughout the figures, and in which:

FIG. 2 is a schematic illustration of an exemplary control tag that is useful for understanding the present invention.

DETAILED DESCRIPTION OF THE INVENTION

Figure 1:
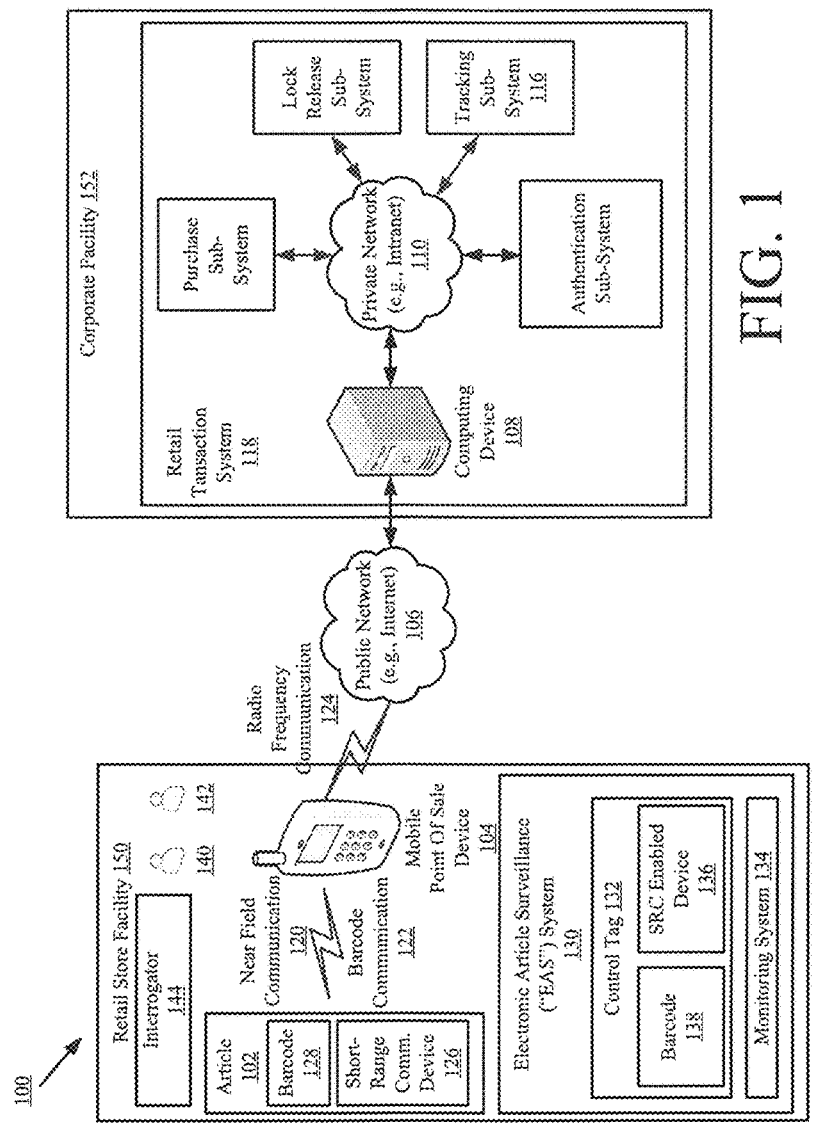
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-3. Embodiments generally relate to novel systems and methods for selective device responsiveness using a plurality of control tags affixed to a plurality of objects. The control tags include, but are not limited to, security tags, security labels, inventory control tags, inventory control labels, and any other tag/label which can be coupled or affixed to an object. The methods involve: receiving, by a plurality of control tags, a reporting command signal sent from an interrogation device via a communications link; and communicating a response to the reporting command signal from only those of the plurality of control tags which are (1) currently being moved, (2) have been moved within a first specified period of time, and/or (3) have a surrounding environment with at least one characteristic that has recently changed.

Such novel methods overcome various drawbacks of conventional object tracking techniques. For example, conventional object tracking techniques generally involve reading all control tags located in the room or space, and then determine which of a plurality of control tag(s) have been removed from the room or space. In contrast, the novel methods simply involve reading only control tags of interest (e.g., those that are moving or have been moved in a specified period of time) which are located in the room or space so as to immediately determine which control tag(s) are being removed therefrom. Consequently, the novel methods of the present invention are significantly less time consuming and error prone as compared to the conventional inventory tracking technique.

Referring now to FIG. 1, there is provided a schematic illustration of an exemplary system 100 that is useful for understanding the present invention. As noted above, the present invention concerns systems and methods for selective device responsiveness Prior to discussing such systems and methods, a brief discussion of an overall EASIC system is provided to assist a reader in understanding an exemplary retail store environment in which the present invention can be employed. Notably, the present invention is not limited to retail store applications. The present invention can be used in any application in which motion of an object, a person, and/or equipment needs to be reported and/or tracked (e.g., a stock room application, loading dock application, and/or surveillance/security application). As would be understood by a person skilled in the art, the control tag can be modified from what is described herein in accordance with any application. For example, the control tag is described as comprising a retail store control tag which is able to communicate with a point of sale device. In other applications, the control tag may not have this capability.

In the retail store scenarios, the system 100 is generally configured to allow a customer to purchase an article 102 using wireless communication technology. The wireless communication technology can include, but is not limited to, SRC technology and/or mobile communication technology. The SRC technology includes, but is not limited to, barcode technology, NFC technology, InfRared ("IR") technology, Wireless Fidelity ("Wi-Fi") technology, Radio Frequency Identification ("RFID") technology, Bluetooth technology, and/or ZigBee technology. In the RFID scenarios, considering the current tag design/technology and sensitivity of common interrogators, the communications range can fall within 1 inch to 50 feet, for example. The mobile communication technology can include, but is not limited to, Radio Frequency ("RF") communication technology.

As shown in FIG. 1, system 100 comprises a retail store facility 150 including an EASIC 130. The EASIC 130 comprises a monitoring system 134 and at least one control tag 132. Although not shown in FIG. 1, the control tag 132 is attached to article 102, thereby protecting the article 102 from an unauthorized removal from the retail store facility 150. The monitoring system 134 establishes a surveillance zone (not shown) within which the presence of the control tag 132 can be detected. The surveillance zone is established at an access point (not shown) for the retail store facility 150. If the control tag 132 is carried into the surveillance zone, then an alarm is triggered to indicate a possible unauthorized removal of the article 102 from the retail store facility 150.

During store hours, a customer 140 may desire to purchase the article 102. The customer 140 can purchase the article 102 without using a fixed POS station (e.g., a checkout counter) or a mobile POS device (e.g., a Smartphone) 104. The mobile POS device 104 can be in the possession of the customer 140 or a store associate 142 at the time of a purchase transaction. POS stations/devices are well known in the art, and therefore will not be described herein. Still, it should be noted that the POS stations/devices have retail transaction applications installed thereon that are configured to facilitate the purchase of article 102 and the detachment of control tag 132 from article 102. The retail transaction applications can be pre-installed applications, add-on applications or plug-in applications.

In all scenarios, the retail transaction applications facilitate the exchange of data between the article 102, control tag 132, customer 140, store associate 142, and/or Retail Transaction System ("RTS") 118. For example, after a retail transaction application is launched, a user 140, 142 is prompted to start a retail transaction process for purchasing the article 102. The retail transaction process can be started simply by performing a user software interaction, such as by depressing a key on a keypad of the POS station/device or touching a button on a touch screen display of the POS station/device.

Subsequently, the user 140, 142 may manually input into the retail transaction application article information. Alternatively or additionally, the user 140, 142 places a control tag reader (not shown in FIG. 1) of the POS station/device in proximity of article 102. As a result of this placement, the POS station/device obtains article information from the article 102. The article information includes any information that is useful for purchasing the article 102, such as an article identifier and an article purchase price. In some scenarios, the article information may even include an identifier of the control tag 132 attached thereto. The article information can be communicated from the article 102 to the POS station/device via an SRC, such as a barcode communication 122 or an NFC 120.

In the barcode scenario, article 102 has a barcode 128 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the article 102 and/or a purchase price of article 102. The barcode 128 is read by a barcode scanner/reader (not shown in FIG. 1) of the POS station/device. Barcode scanners/readers are well known in the art. Any known or to be known barcode scanner/reader can be used herein without limitation.

In the NFC scenarios, article 102 may comprise an SRC enabled device 126. The SRC enabled device 126 can be separate from control tag 132 or comprise control tag 132. An SRC communication 120 occurs between the SRC enabled device 126 and the POS station/device over a relatively small distance (e.g., N centimeters or N inches, where N is an integer such as twelve). The SRC communication 120 may be established by touching components 126, 104 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz or 928 MHz. NFC transceivers are well known in the art, and therefore will not be described in detail herein. Any known or to be known NFC transceivers can be used herein without limitation.

After the POS station/device obtains the article information, payment information is input into the retail transaction application by the user 140, 142. Upon obtaining the payment information, the POS station/device automatically performs operations for establishing a retail transaction session with the RTS 118. Retail transaction sessions are well known in the art, and therefore will not be described herein. Still, it should be noted that such retail transaction sessions can involve communicating information to and from the RTS 118 via an RF communication 124 and public network 106 (e.g., the Internet); and completing a purchase transaction by the RTS 118. When the purchase transaction is completed, a signal or message is generated and sent to the POS station/device indicating whether the article 102 has been successfully or unsuccessfully purchased.

If the article 102 has been successfully purchased, then a control tag detaching and/or deactivating process can be started automatically by the RTS 118 or by the POS station/device. Alternatively, the user 140, 142 can start the control tag detaching/deactivating process be performing a user-software interaction using the POS station/device. Once the control tag 132 has been detached from article 102 or deactivated, the customer 140 can carry the article 102 through the surveillance zone without setting off the alarm.

In some scenarios, it is desirable to monitor and/or track control tags 132 prior to being detached from articles 102 offered for sale by the retailer. Accordingly, the present invention concerns methods for control tag motion and inventory tracking within a particular geographic area (e.g., a retail store facility 150). Exemplary embodiments of such methods will be discussed in detail below in relation to FIGS. 3A-3B. Still, it should be understood that such methods are at least partially implemented by the control tags 132, an interrogator 144 (e.g., an RFID reader), and/or the retail transaction system 118. Interrogators are well known in the art, and therefore will not be described herein. Still, it should be understood that the interrogator 144 can be part of or can be separate from the POS station/device 104 and/or the monitoring system 134.

In all scenarios, the interrogator 144 is configured to communicate SRC signals or messages to and from the control tags 132. The SRC signals/messages can include, but are not limited to, first command signals/messages instructing the control tags to perform regular reporting operations, second command signal/messages instructing the control tags to perform special reporting operations, and/or request signals/messages requesting that the control tag provide certain information to the interrogator 144. The first command signals/messages are employed during certain first applications, such as purchase transaction applications. In contrast, the second command signals/messages are employed during certain second applications, such as control tag motion and inventory tracking applications.

In the active control tag scenario, the second command signals/messages include information instructing the control tags to perform special reporting operations, i.e., optionally provide a response signals/message indicating results of previously performed sensing operations to the interrogator 144. For example, an active control tag is powered by an internal battery (e.g., battery 220 of FIG. 2). Therefore, it can periodically or continuously perform sensing operations prior to and/or subsequent to the reception of the second command signals/message. The sensing operations can involve: detecting movement of the control tag and/or changes in a condition of a surrounding environment; storing first information relating to the detected movement and/or condition change in an internal memory of the control tag (e.g., memory 208 of FIG. 2); and/or setting a first value of at least one reporting parameter (e.g., an RFID protocol session 1 parameter value, an RFID protocol session 2 parameter value, etc.) of the control tag based on results of said detecting. In response to the reception of the second command signals/message, the control tag 132 processes the first information and/or first value to determine if it should provide the response signals/message to the second command signals/message. In some scenarios, the control tag should provide the response signals/message if: (1) it is currently being moved by a person with or without the assistance of equipment; (2) it has been moved within a given period of time; and/or (3) at least one condition of a surrounding environment has changed within a given period of time. If conditions (1), (2) and/or (3) do not exist, then the control tag 132 does not generate and send the response signal/message to the second command signal/message. Rather, the control tag continues with other operations. In contrast, if conditions (1), (2) and/or (3) exist, then the control tag 132 generates and sends the response signal/message to the interrogator 144 responding to the second command signal/message. Thereafter, the interrogator 144 can send information request messages addressed directly to the control tag requesting provision of certain inventory-related information (e.g., location of the control tag within a geographic area, article information, and a unique identifier of the control tag).

In the passive control tag scenarios, the second command signals/messages include information instructing the control tags to perform special reporting operations, i.e., optionally provide a response signal/message indicating results of currently performed sensing operations to the interrogator 144. For example, in response to the reception of the second command signal/message, power is supplied to an electronic circuit of the control tag. In turn, the control tag performs sensing operations. Based on results of the sensing operations, the control tag determines whether: (1) it is currently being directly or indirectly moved by a person; (2) it has been moved within a given period of time; and/or (3) at least one condition of a surrounding environment has changed within a given period of time. If conditions (1), (2) and/or (3) do not exist, then the control tag 132 does not generate and/or send the response signal/message to the second command signal/message. Instead, the control tag 132 continues with other operations. In contrast, if conditions (1), (2) and/or (3) exist, then the control tag 132 sends the response signal/message to the interrogator 144 responding to the second command signal/message. Thereafter, the interrogator 144 can send information request signals/messages addressed directly to the control tag requesting provision of certain inventory-related information.

The inventory-related information contained in the response signals/messages can include, but is not limited to, information specifying the current location and/or past locations of the control tag 132. This location information may be forwarded from the interrogator 144 to the retail transaction system 118 for storage in a tracking sub-system 116. The response may also comprise article information and a unique identifier for the control tag 132. The location information, article information and/or unique identifier can be subsequently processed by the retail transaction system 118 to: generate a map, list, table or other display illustrating the locations of control tags within the retail store facility 150; and/or generate a list, table or graph specifying a current inventory of the retail store.

Notably, the above described novel selective device responsiveness and inventory tracking methods of the present invention overcome certain drawbacks of conventional control tag tracking techniques. For example, the present invention provides a way to quickly track employees and equipment that are moving within the retail store facility 150 without having to use multiple physical zones or independent methods for determining control tag motion. Also, these novel selective device responsiveness and inventory tracking methods ensure that only a limited number of control tags respond to interrogation by the interrogator 144 at any given time. Accordingly, the present invention provides a means to reduce the number of responses from control tags in a given environment to a limited number of those control tags that are of interest.

Implementation of the novel methods of the present invention requires no or only minimal modifications to conventional interrogators and/or control tags. In this regard, conventional RFID protocol session signals/messages can be used as the inventory command signals/messages such that no modifications are required to be made to conventional interrogators. Additionally or alternatively, custom signals/messages can be employed for this purpose. In this case, only minimal software modifications are required to be made to the conventional interrogators. In all interrogator scenarios, at least one sensing device likely needs to be added to a control tag with an SRC communication capability or directly to an SRC chip of a control tag simply by changing the SRC chip to include the sensor. Software modifications to the control tag may also be required for allowing the control tag to process the custom signals/messages.

Referring now to FIG. 2, there is provided a schematic illustration of an exemplary architecture for control tag 132. Control tag 132 can include more or less components than that shown in FIG. 2. However, the components shown are sufficient to disclose an illustrative embodiment implementing the present invention. Some or all of the components of the control tag 132 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative control tag 132 configured to facilitate the selective device responsiveness and inventory tracking. In this regard, the control tag 132 may have a barcode 138 affixed thereto and/or an SRC enabled device 136 for allowing data to be exchanged with an external device (e.g., monitoring system 134, POS station/device 104, and/or interrogator 144 of FIG. 1) via barcode technology and/or NFC technology.

The SRC enabled device 136 comprises an antenna 202 for allowing data to be exchanged with the external device (e.g., monitoring system 134, POS station/device 104, and/or interrogator 144 of FIG. 1) via SRC technology. The antenna 202 is configured to receive SRC signals from the external device and transmit SRC signals generated by the SRC enabled device 136. The SRC enabled device 136 comprises an SRC transceiver 204. SRC transceivers are well known in the art, and therefore will not be described herein. However, it should be understood that the SRC transceiver 204 processes received SRC signals to extract information therefrom. This information can include, but is not limited to, first command signals/messages instructing the control tag to perform regular reporting operations, second command signals/messages instructing the control tag to perform special reporting operations, and request signals/messages requesting that the control tag provide certain information (e.g., a unique identifier 210, location information 212, article information 214, and/or environment information 218), and/or signals/messages including information specifying a detachment key or code for detaching the control tag 132 from an article. The SRC transceiver 204 may pass the extracted information to the controller 206.

At the controller 206, the information may be pre-processed for decrypting the same if it was received in an encrypted form. The information may also be pre-processed to determine whether the SRC signal is to be handled by the control tag 132, i.e., to verify that the SRC signal is directed or targeted to the control tag 132. Such a determination can be made by comparing an identifier contained in the SRC signal to the unique/group identifier(s) 210 stored in memory 208. If the identifiers match each other, then it is determined that the SRC signal is intended to be handled by the control tag 132. The information may further be pre-processed to identify the type of information contained in the SRC signal, i.e., whether or not the SRC signal includes a regular reporting command signal/message, a special reporting command signal/message, or a request for certain information.

If the extracted information includes a regular reporting command signal/message, then the SRC enabled device 136 performs regular reporting operations. For example, the SRC enabled device generates and sends a response signal/message to the external device from which the regular reporting command signal/message was received. In this case, all control tags that received the reporting command would respond thereto. If there are a relatively large number of control tags in range of the external device (e.g., >1000 control tags), then signal interference may undesirably occur.

In contrast, if the extracted information includes a special reporting command signal/message, then the SRC enabled device 136 performs special reporting operations. For example, the SRC enabled device generates and sends a response signal/message to the external device if at least one of the following conditions is met: the control tag is currently being or has recently been moved by a person with or without assistance of equipment (e.g., a wheeled cart, an elevator, and/or a piece of heavy machinery); and/or a change has recently occurred with regard to at least one condition of a surrounding environment (e.g., a change in temperature, light, atmospheric pressure, electric field, magnetic field, etc.). In this case, only the control tags of interest would respond to the reporting command. As such, the amount of interference and reflection from idle control tags is limited. Also, the time spent by the external device communicating with only the control tags of interest is maximized. Furthermore, interrogators at store exits and other locations can now effectively track the small number of moving control tags and provide proper control and inventory tracking. Additionally, techniques such as Doppler Effect or phase detection become effective as well as physical zone detection. The number of false positive alarms is greatly reduced and the accuracy of detection of real theft becomes greatly increased.

In some scenarios, the special reporting operations are performed at least partially by the controller 206 of the SRC enabled device 136. More specifically, the controller 206 may perform operations to determine whether the control tag 132 should respond to the special reporting command signal/message. This determination can be based on various types of information. For example, the controller 206 can determine that the control tag 132 should respond to the special reporting command signal/message if at least one reporting parameter value is set to a particular value indicating that the control tag should or should not respond to the received special reporting command signal/message. The reporting parameter value can be stored in memory as parameter information 222. If it is determined that the control tag should not respond to the special reporting command signal/message, then the controller 206 continues with other operations or ceases all operations. The other operations include, but are not limited to, monitoring the location of the control tag, detecting movement of the control tag, and/or detecting changes in conditions of a surrounding environment. When the controller 206 detects movement of the control tag within a certain period of time and/or a change in a condition of the surrounding environment, the controller 206 changes the reporting parameter value to indicate that the control tag should respond to a next interrogation from the same or different external device.

The reporting parameter value(s) can be set to indicate that the control tag should respond to the interrogation if the controller 206 determines that (1) the control tag is currently being moved by a person with or without the assistance of equipment (e.g., a wheeled cart, an elevator, and/or a piece of heavy machinery), (2) the control tag has been moved by the person within a predefined period of time, (3) at least one measured parameter of a surrounding environment has a value equal to, above and/or below a threshold value, and/or (4) at least one measured parameter value has changed in a predetermined period of time. The occurrence of (1)-(4) can be determined or detected using at least one sensor 262. The sensor 262 can include, but is not limited to, an accelerometer, a vibration sensor, a gyroscope, a temperature sensor, a light sensor, an electric or magnetic field sensor, and/or a moisture sensor.

If it is determined that the control tag should respond to the request, then the controller 206 retrieves at least the unique identifier 210 from memory 208. The retrieved information is then sent from the control tag 132 to a requesting external device (e.g., monitoring system 134, POS station/device 104, and/or interrogator 144 of FIG. 1) via an SRC communication. Thereafter, the mode parameter value is reset to indicate that the control tag should not respond to a special reporting command signal/message received from an external device.

Also, in the active control tag scenarios, the control tag can once again automatically begin monitoring the location of the control tag, movement of the control tag, and/or conditions of a surrounding environment. When the controller 206 detects movement of the control tag and/or a change in a condition of the surrounding environment, the controller 206 changes the reporting parameter value to indicate that the control tag should respond to a next interrogation from the same or different external device.

If the extracted information contains a request for information as opposed to a reporting command, then the SRC enabled device 136 performs information retrieval operations. For example, the SRC enabled device 136 retrieves the requested information from memory 208. The requested information can include, but is not limited to, the unique/group identifier(s) 210, location information 212, article information 214, and/or environment information 218. The unique identifier 210 includes information that uniquely identifies the control tag, such as string of digits. The article information 214 can include a unique identifier of an article, a purchase price of the article, and/or information specifying at least one characteristic of the article. The location information 212 can include information specifying the current location of the control tag 132 within a specified area (e.g., a retail store facility 150 of FIG. 1) and/or at least one previous location of the control tag 132 within the specified area. Such location information can be generated by a locator 266 contained within the SRC enabled device 136.

The locator 266 is operative to determine locations of the control tag via a triangulation technique, a time of flight technique or a Global Positioning System ("GPS") technique. Each of these listed techniques is well known in the art, and therefore will not be described herein. The environment information 218 can include information specifying measured values for motion, temperature, light, an electric field, a magnetic field, and/or moisture. The measured values can be obtained by sensor(s) 262 and stored in memory 208.

If the extracted information includes information specifying a one-time-only use key and/or instructions for programming the control tag 132 to actuate a detachment mechanism 250 of an electro-mechanical lock mechanism 216, then the controller 206 may perform operations to simply actuate the detachment mechanism 250 using the one-time-only key. The detachment mechanism 250 is configured to unlock a lock and/or to release a tack, pin or lanyard that keeps the control tag 132 attached to an article. The tack, pin or lanyard can be manually removed or mechanically removed by the detachment mechanism 250. In this regard, the detachment mechanism 250 includes, but is not limited to, a solenoid, a linear motor/actuator, a motor, a conductive coil/magnet combination, and/or an alloy that changes shape when exposed to an electromagnetic or magnetic field. Once the detachment mechanism 250 has been actuated, an auditory indication (e.g., a buzzer) and/or visual indication (e.g., emitted light from a Light Emitting Diode ("LED") of such actuation can be provided by indicator 264.

The electro-mechanical lock mechanism 216 is operable to actuate the detachment mechanism 250. The detachment mechanism 250 is generally configured to: (a) release a lock, a tack, pin or a lanyard that keeps the control tag 132 attached to an article; and/or (b) move a lock between a lock state and an unlock state. The electro-mechanical lock mechanism 216 is shown as being indirectly coupled to SRC transceiver 204 via controller 206. The invention is not limited in this regard. The electro-mechanical lock mechanism 216 can additionally or alternatively be directly coupled to the SRC transceiver 204. One or more of the components 204, 206 can cause the tack, pin, lanyard or lock of the detachment mechanism 250 to be transitioned between states in accordance with information received from an external device (e.g., MCD 104 of FIG. 1).

In some scenarios, the connections between components 204, 206, 208, 216, 260, 262, 264, 266 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The components 204-208, 260-266 and a battery 220 may be collectively referred to herein as the SRC enabled device 136. The SRC enabled device 136 can be incorporated into a device which also houses the electro-mechanical lock mechanism 216, or can be a separate device which is in direct or indirect communication with the electro-mechanical lock mechanism 216. The SRC enabled device 136 is coupled to an optional power source. The power source may include, but is not limited to, battery 220 or an A/C power connection (not shown). The status of the power source can be continuously or periodically monitored by controller 206. Alternatively or additionally, the SRC enabled device 136 is configured as a passive device which derives power from an RF signal inductively coupled thereto.

Figure 3A:
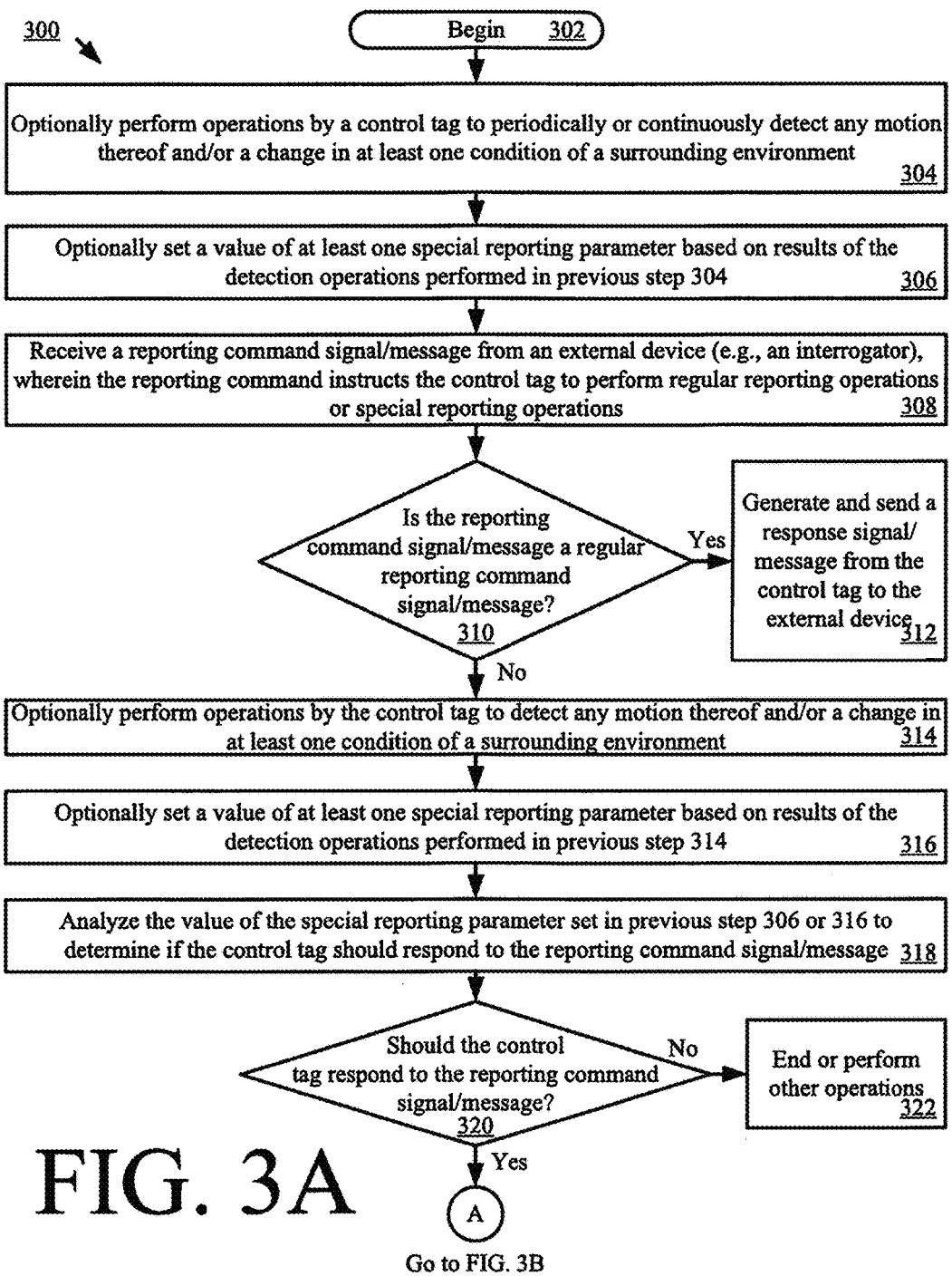
FIGS. 3A-3B collectively provide a flow diagram of an exemplary method for selective device responsiveness that is useful for understanding the present invention.
Figure 3B:
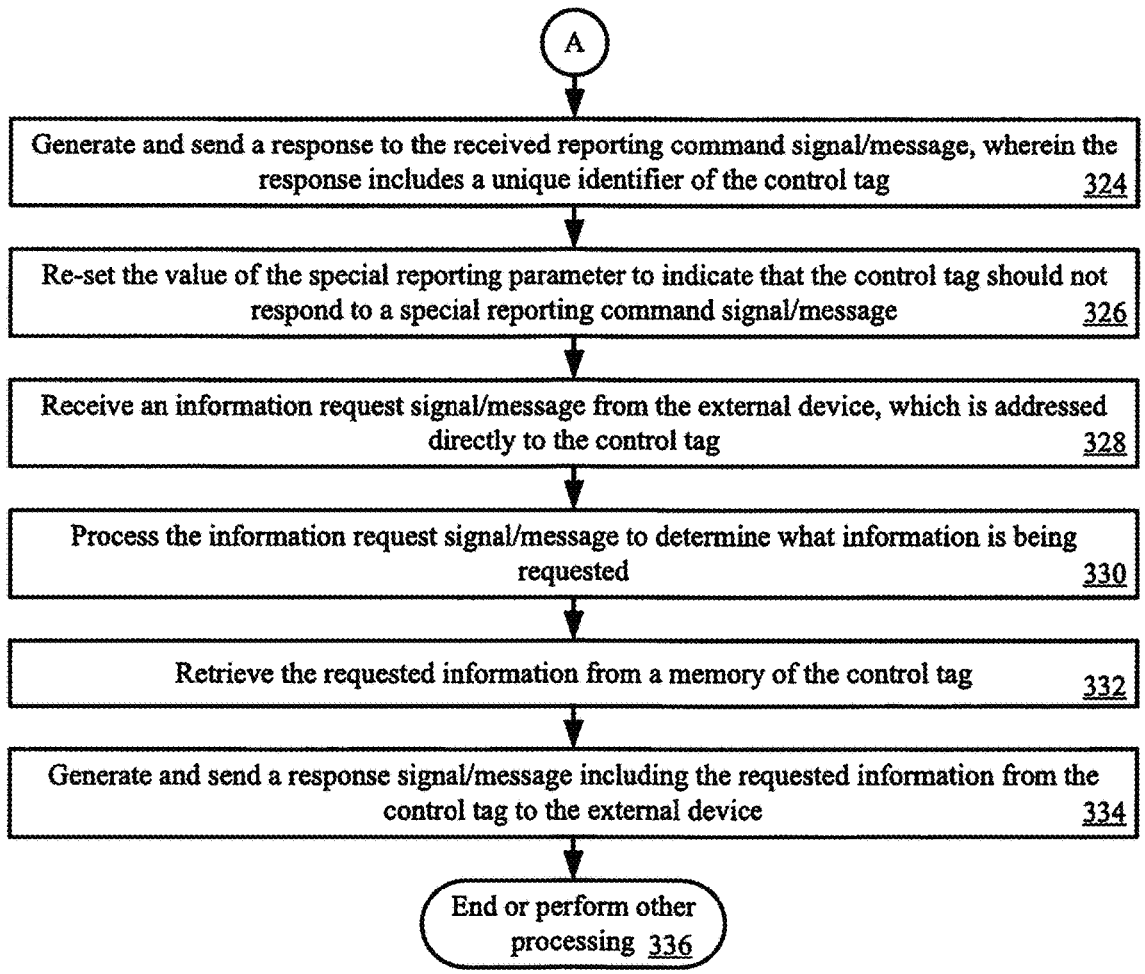

Referring now to FIGS. 3A-3B, there is provided a flow diagram of an exemplary method 300 for selective device responsiveness that is useful for understanding the present invention. Method 300 begins with step 302 and continues with optional steps 304 and 306. Optional steps 304 and 306 are performed when the control tag (e.g., control tag 132 of FIGS. 1-2) is an active control tag which is powered by a power source, such as a battery (e.g., battery 220 of FIG. 2). If the control tag is a passive control tag, then optional steps 304-306 would not be performed.

Optional step 304 involves performing operations by the control tag to periodically or continuously detect any motion or movement thereof and/or any change in at least one condition of a surrounding environment. For example, sensors of the control tag (e.g., sensors 262 of FIG. 2) can be used to (a) sense a change in position of the control tag within a three dimensional space, (b) sense vibration of the control tag for a pre-determine period of time, and/or (c) sense a change in temperature, an amount of light, strength of an electric field, strength of a magnetic field, an amount of moisture, and/or a level of fluid pressure of a surrounding environment. Information specifying results of the sensing can then be stored in a memory of the control tag (e.g., memory 208 of FIG. 1).

Thereafter, in optional step 306, the control tag performs operations to set a value of at least one special reporting parameter based on results of the sensing. For example, if the sensing indicates that specified conditions exist, then the value of the special reporting parameter is set to indicate that the control tag should perform special reporting operations when commanded to do so by an external device. In contrast, if the sensing indicates that said specified conditions do not exist, then the value of the special reporting parameter is left alone or re-set to indicate that the control tag should not perform special reporting operations when commanded to do so by an external device.

In some scenarios, the special reporting parameter is an RFID protocol session parameter which is transitionable between two states A and B. RFID protocol session parameters are well known in the art, and therefore will not be described herein. Additionally or alternatively, the specified conditions include one of or a combination of two or more of the following events: a change in the location of the control tag within a pre-defined geographic area and/or within a certain period of time; movement or vibration of the control tag within and/or for a specified period of time; and a change in temperature, an amount of light, strength of an electric field, strength of a magnetic field, an amount of moisture, and/or a level of fluid pressure of a surrounding environment.

In a next step 308, the control tag receives a reporting command signal/message from an external device (e.g., interrogator 144 of FIG. 1). The reporting command of this signal/message instructs the control tag to perform regular reporting operations or special reporting operations. Upon receiving the reporting command signal/message, the control tag processes the signal/message to determine whether it is a regular reporting command signal/message or a special reporting command signal/message, as shown by decision step 310. If the message is a regular reporting command signal/message [310:YES], then step 312 is performed in which the control tag generates and sends a response signal/message to the external device. In some scenarios, the response signal/message includes a unique identifier (e.g., unique identifier 210 of FIG. 2) for the control tag. As would be understood by a person skilled in the art, other operations can be performed upon the completion of step 312.

If the message is a special reporting command signal/message, then optional steps 314 and 316 are performed. Optional steps 314 and 316 can be performed if the control tag is a passive control tag. Optional step 314 is similar to optional step 304. Likewise, optional step 316 is similar to optional step 306. As such, the description provided above in relation to steps 304-306 is sufficient for understanding steps 314-316.

In a next step 318, the control tag analyzes the value of the special reporting parameter set in previous step 306 or 316 to determine if it should respond to the reporting command signal/message. If the value of the special reporting parameter indicates that the control tag should not respond to the reporting command signal/message, then step 322 is performed where method 300 ends or the control tag performs other operations. In contrast, if the value of the special reporting parameter indicates that the control tag should respond to the reporting command signal/message, then method 300 continues with step 324 of FIG. 3B.

As shown in FIG. 3B, step 324 involves performing operations by the control tag to generate and send a response to the received reporting command signal/message. The response may include a unique identifier of the control tag (e.g., unique identifier 210 of FIG. 2). After sending the response signal/message, the value of the special reporting parameter is re-set to indicate that the control tag should not respond to a special reporting command signal/message, as shown by step 326.

In some scenarios, the control tag may receive an information request signal/message from the external device subsequent to responding to the reporting command signal/message, as shown by step 328. Upon the reception of the information request signal/message, the control tag processes the same to determine what information is being requested by the external device. Next in step 332, the requested information is retrieved from a memory of the control tag (e.g., memory 208 of FIG. 2). Thereafter in step 334, the control tag generates and sends a response signal/message including the retrieved information to the external device. Once step 334 is completed, step 336 is performed where method 300 ends or other processing is performed.

In view of the forgoing, the present invention provides novel systems and methods for selective device responsiveness and inventory tracking. Such systems and methods enable interrogators to selectively read stationary tags, moving control tags, and/or moved control tags at any given time. For example, in some scenarios, an interrogator can first read moving control tags, and thereafter read control tags which were moved in a specified period of time. Currently, RFID protocols support four simultaneous sessions. Each session has two states A and B. One way to implement this scenario is to have the state of at least one session automatically controlled by the motion detection of the control tag, and the states of the other remaining sessions controlled by the interrogator so as to allow the interrogator to select control tags of interest (such as moved or moving control tags).

In other scenarios, a state of a first session can be controlled to indicate that the control tag should operate in regular reporting mode. The states of the remaining three sessions can be controlled to indicate that the control tag should operate in special reporting mode. For example, the state of a second session can be controlled to indicate that the control tag is or is not currently moving. A state of a third session can be controlled to indicate that the control tag has or has not moved in a specified period of time. A state of a fourth session can be controlled to indicate that a change in at least one condition of a surrounding environment has occurred. Embodiments of the present invention are not limited to the particularities of this example. Still, such a use of RFID protocol session parameters requires no modifications to conventional interrogator hardware and/or software architectures, and therefore provides a cost effective implementation of the present invention.

Notably, the present invention has many advantages. For example, the present invention provides a means for reducing the amount of interference and reflection from idle control tags, as well as the amount of time an interrogator communicates with control tags that are not of interest. Additionally, the present invention allows monitoring systems to effectively track a relatively small number (e.g., <100) of a plurality of control tags (e.g., >1000) which are of interest (e.g., moved or moving control tags), and provide proper control of inventory. Furthermore, the number of false positive alarms is greatly reduced in systems of the present invention. As such, the accuracy of detection of real theft is greatly increased. The present invention also creates data metrics useful to retail stores and other entities about what objects have been moved or are being moved by various persons with or without assistance from equipment (e.g., customers, employees, thieves, etc.). The data metrics can be used to assist in inventory/object tracking, employee tracking, and/or equipment tracking.

The following EXAMPLE 1 is provided for purposes of explaining in more detail the present invention. The present invention is not limited to the contents of EXAMPLE 1.

Example 1

Stocking rooms and/or loading dock areas may contain tens of thousands of control tags in a given room or space. The present invention provides a way to only track those control tags that are being removed from the room or space. As inventory is removed from the room or space, the control tags associated with that inventory respond to an interrogation by an interrogator. Information relating to the responding control tags are then removed from a particular inventory report. The rest of the tens of thousands of control tags in the room or space do not respond. This reduces the level of false positive alarms and the accuracy of real theft detection is increased.

The conventional inventory tracking techniques generally involve reading all control tags located in the room or space, and then determine which control tag(s) have previously been removed from the room or space. This conventional inventory tracking technique is much more time consuming and error prone as compared to the inventory tracking technique of the present invention.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for selective device responsiveness using a plurality of control tags attachable to a plurality of objects, comprising:
   receiving, by a plurality of control tags, a first reporting command signal sent from an interrogation device via a communications link;
   transitioning operational states of the plurality of control tags to a regular reporting operational state;
   wirelessly communicating a first response to the first reporting command signal from all of the plurality of control tags;
   receiving, by the plurality of control tags, a second reporting command signal sent from the interrogation device via the communications link
   transitioning the operational states of the plurality of control tags to a special reporting operational state in response to the second reporting command; and
   wirelessly communicating a response to the second reporting command signal from only those of the plurality of control tags which (1) are currently being moved, (2) have been moved within a first specified period of time, or (3) have a surrounding environment with at least one characteristic that has recently changed, where condition (1), (2) or (3) is determined using sensor data acquired by at least one control tag of the plurality of control tags.

2. A method for selective device responsiveness using a plurality of control tags attachable to a plurality of objects, comprising:
   receiving, by the plurality of control tags, a reporting command signal sent from an interrogation device via a wireless communications link, wherein the reporting command signal comprises information indicating that it is a special reporting command signal to which only certain ones of the plurality of control tags should respond;
   in response to the special reporting command signal, transitioning operational states of the plurality of control tags from a first reporting operational state in which responses to reporting commands are provided in accordance with a first reporting scheme to a second reporting operational state in which responses to reporting commands are provided in accordance with a second different reporting scheme; and subsequent to said transitioning,
- performing, by each control tag of the plurality of control tags, sensing operations to detect motion or a change in a characteristic of a surrounding environment;
- determining which said control tags comprise the only certain ones of the plurality of control tags based on results of the sensing operations; and
- wirelessly communicating a response to the reporting command signal from the only certain ones of a plurality of receiving control tags.

3. The method of claim 2, wherein each said control tag of the plurality of control tags obtains information from the sensing operations indicating that at least one of the following conditions does or does not exist: (1) the control tag is currently being moved; (2) the control tag has been moved within a first specified period of time; and (3) the characteristic of the surrounding environment has changed within a second specified period of time.

4. The method of claim 2, wherein at least one of the plurality of control tags comprises a transceiver, a Radio Frequency Identifier device, and a motion sensor.

5. The method according to claim 3, wherein the said control tags comprise the only certain ones of the plurality of control tags when at least one the conditions exists.

* * * * *